US012812453B2

(12) United States Patent
Gupta et al.

(10) Patent No.: US 12,812,453 B2
(45) Date of Patent: Nov. 24, 2026

(54) AUTHORIZATION FOR STREAM CLASSIFICATION SERVICE (SCS) REQUESTS FOR PEER-TO-PEER TRAFFIC FLOWS

(71) Applicant: Cisco Technology, Inc., San Jose, CA (US)

(72) Inventors: Binita Gupta, San Diego, CA (US); Malcolm M. Smith, Richardson, TX (US); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 68 days.

(21) Appl. No.: 18/786,375

(22) Filed: Jul. 26, 2024

(65) Prior Publication Data

US 2025/0220497 A1 Jul. 3, 2025

Related U.S. Application Data

(60) Provisional application No. 63/616,560, filed on Dec. 30, 2023.

(51) Int. Cl.
*H04W 28/02* (2009.01)
*H04L 67/104* (2022.01)

(52) U.S. Cl.
CPC ....... *H04W 28/0268* (2013.01); *H04L 67/104* (2013.01)

(58) Field of Classification Search
CPC ......................... H04W 28/0268; H04L 67/104
See application file for complete search history.

(56) References Cited

U.S. PATENT DOCUMENTS

2014/0112264 A1* 4/2014 Bao ........................ H04W 72/20 370/329
2021/0219186 A1* 7/2021 Canpolat ............... H04W 28/24
(Continued)

FOREIGN PATENT DOCUMENTS

WO 2022026311 A1 2/2022
WO 2023203064 A1 10/2023

OTHER PUBLICATIONS

Gupta (Cisco Systems) B., et al., "LB275 CR for SCS TCLAS Enhancements", IEEE Draft, IEEE-SA Mentor, Piscataway, NJ, USA, vol. 802.11 EHT, 802.11be, No. 2, Oct. 28, 2023, doc.: IEEE 802.11-23/1540r2, Sep. 8, 2023, pp. 1-9, XP068206774, Retrieved from https://mentor.ieee.org/802.11/dcn/23/11-23-1540-02-00be-1b275-cr-for-scs-tclas-counter- proposal.docx, p. 3-p. 7, tables 9-78.

(Continued)

*Primary Examiner* — Bryan Y Lee
(74) *Attorney, Agent, or Firm* — Merchant & Gould P.C.

(57) ABSTRACT

Authorization for stream classification service requests for Peer-to-Peer (P2P) traffic flows may be provided. An Access Point (AP) may receive a Stream Classification Service (SCS) request from a station for a P2P traffic flow. The SCS request may include a flow identifier for the P2P traffic flow and Quality of Service (QoS) resource requested for the P2P traffic flow. The AP may determine whether to grant the SCS request. Determining whether to grant the SCS request may include determining that a network policy allows the P2P traffic flow based on the flow identifier and determining that the AP can support the QoS resource requested for the P2P traffic flow.

20 Claims, 3 Drawing Sheets

(56) References Cited

U.S. PATENT DOCUMENTS

| | | | |
|---|---|---|---|
| 2023/0058871 A1 | 2/2023 | Xin et al. | |
| 2023/0156516 A1 | 5/2023 | Chu et al. | |
| 2023/0180052 A1 | 6/2023 | Haider et al. | |
| 2023/0315295 A1* | 10/2023 | Chandrashekaraiah | G06F 3/0683 |
| 2023/0379749 A1* | 11/2023 | Canpolat | H04W 28/0263 |
| 2025/0159725 A1* | 5/2025 | Shafin | H04W 28/0268 |

OTHER PUBLICATIONS

International Search Report and Written Opinion for International Application No. PCT/US2024/062338, mailed Mar. 24, 2025, 17 Pages.

* cited by examiner

200

AUTHORIZATION FOR STREAM CLASSIFICATION SERVICE (SCS) REQUESTS FOR PEER-TO-PEER TRAFFIC FLOWS

RELATED APPLICATION

Under provisions of 35 U.S.C. § 119 (e), Applicant claims the benefit of U.S. Provisional Application No. 63/616,560, filed Dec. 30, 2023, which is incorporated herein by reference.

TECHNICAL FIELD

The present disclosure relates generally to authorization for stream classification service requests for peer-to-peer traffic flows.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
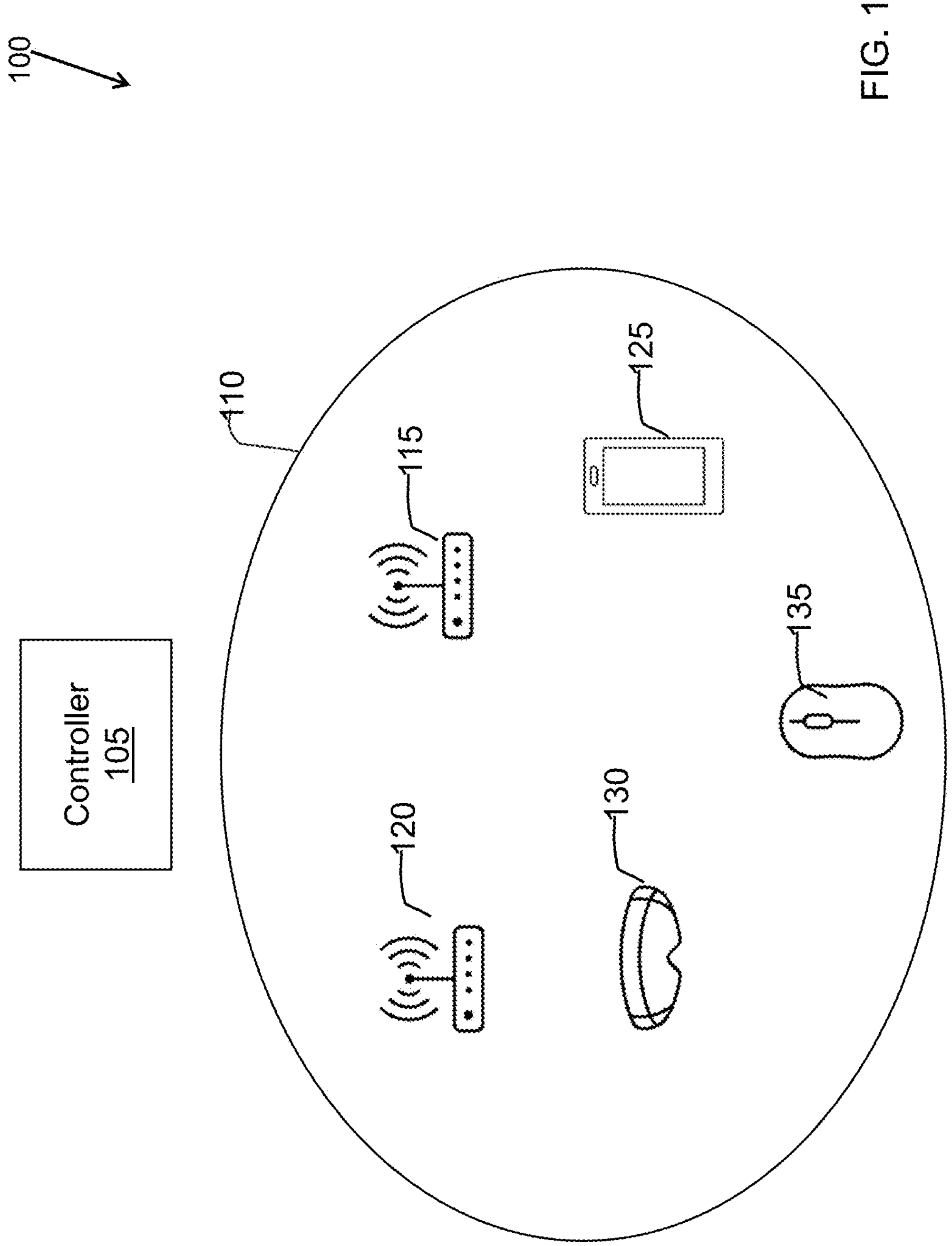
FIG. 1 is a block diagram of an operating environment for authorization for stream classification service requests for peer-to-peer traffic flows.

Authorization for stream classification service requests for Peer-to-Peer (P2P) traffic flows may be provided. An Access Point (AP) may receive a Stream Classification Service (SCS) request from a station for a P2P traffic flow. The SCS request may include a flow identifier for the P2P traffic flow and Quality of Service (QoS) resource requested for the P2P traffic flow. The AP may determine whether to grant the SCS request. Determining whether to grant the SCS request may include determining that a network policy allows the P2P traffic flow based on the flow identifier and determining that the AP can support the QoS resource requested for the P2P traffic flow.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Streaming traffic is among the largest and fastest growing traffic on the internet. Peer-to-Peer (P2P) streaming contributes substantially to this growth. P2P traffic is a decentralized network architecture that allows Stations (STAs) to interact directly with each other. When a STA sends a Stream Classification Service (SCS) request with a Quality of Service (QoS) characteristics element to an Access Point (AP), the STA may provide Traffic Classification (TCLAS) information to identify a P2P traffic flow for that SCS request for Downlink (DL) flow. The QoS characteristics element may be used to indicate QoS resource requirements for the P2P traffic flow. However, for a P2P traffic flow, the Institute of Electrical and Electronics Engineers (IEEE) 802.11be amendment may not support sending the TCLAS information. In the absence of TCLAS information, an AP may not be able to identify a P2P traffic flow for which QoS resources are being requested.

P2P traffic may become more prevalent in enterprise deployments with Augmented Reality/Virtual Reality/Extended Reality (AR/VR/XR) applications on Head Mounted Devices (HMDs) being used for workplace productivity and collaboration. Therefore, it may become increasingly important for an AP to be able to identify P2P traffic flows for which QoS resources are being requested in a SCS request. The disclosure provides processes to enhance the SCS request to provide identification information for the P2P traffic flows. The disclosed enhancements to the SCS request may enable a STA to provide a flow identifier for the P2P traffic flow and QoS resources requested for the P2P traffic flow. The flow identifier may enable the AP to identify or distinguish the P2P traffic flows that are related to enterprise/workplace usage from other P2P traffic flows that are not related to the enterprise/business usage. The AP may use the flow identifier to apply a network policy to accept or reject the SCS request for the P2P traffic flows. For example, the AP may be configured with a network policy to accept SCS requests with the QoS characteristics for the P2P traffic flows related to enterprise/workplace usage and reject SCS requests for the P2P traffic flows that are not related to the enterprise/business usage.

FIG. 1 shows an operating environment 100 for authorization for SCS requests for P2P traffic flows. As shown in FIG. 1, operating environment 100 may comprise a controller 105 and a coverage environment 110. Coverage environment 110 may comprise, but is not limited to, a Wireless Local Area Network (WLAN) comprising a plurality of APs that may provide wireless network access (e.g., access to the WLAN for client devices). The plurality of APs may comprise a first AP 115 and a second AP 120. The plurality of APs may provide wireless network access to a plurality of STAs as they move within coverage environment 110. The plurality of STAs may comprise, but are not limited to, a first STA 125, a second STA 130, and a third STA 135. Ones of the plurality of STAs may comprise, but are not limited to, a smart phone, a HMD, a mice, a keyboard, a personal computer, a tablet device, a mobile device, a telephone, a remote control device, a set-top box, a digital video recorder, an Internet-of-Things (IoT) device, a network computer, a router, AR/VR/XR devices, or other similar microcomputer-based device. Each of the plurality of APs may be compatible with specification standards such as, but not limited to, the IEEE 802.11 specification standard for example.

The plurality of APs and the plurality of STAs may use Multi-Link Operation (MLO) where they simultaneously transmit and receive across different bands and channels by establishing two or more links to two or more AP radios. These bands may comprise, but are not limited the 2 GHz band, the 5 GHz band, the 6 GHz band, and the 60 GHz band.

Controller 105 may comprise a Wireless Local Area Network controller (WLC) and may provision and control coverage environment 110 (e.g., a WLAN). Controller 105 may allow first STA 125, second STA 130, and third STA 135 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide authorization for SCS requests for P2P traffic flows.

The elements described above of operating environment 100 (e.g., controller 105, first AP 115, second AP 120, first STA 125, second STA 130, or third STA 135) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 300.

Figure 2:
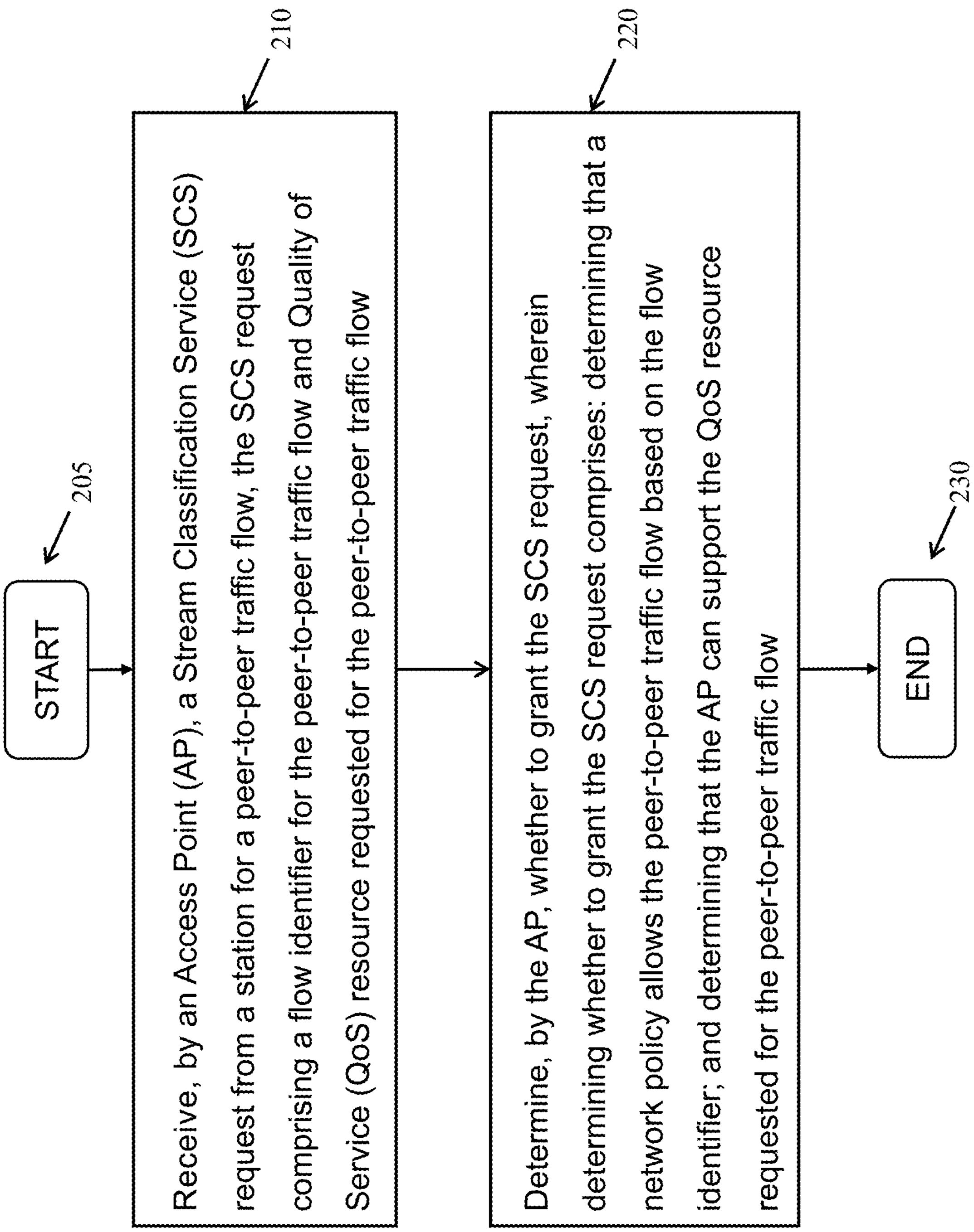
FIG. 2 is a flow chart of a method for providing authorization for stream classification service requests for peer-to-peer traffic flows.

FIG. 2 is a flow chart setting forth the general stages involved in a method 200 consistent with embodiments of the disclosure for authorization for SCS requests for P2P traffic flows. Method 200 may be implemented using first AP 115 and first STA 125 as described in more detail above with respect to FIG. 1. Ways to implement the stages of method 200 will be described in greater detail below.

Method 200 may begin at starting block 205 and proceed to stage 210 where first AP 115 may receive a SCS request from first STA 125 for a P2P traffic flow. The SCS request may comprise a flow identifier for the P2P traffic flow and QoS resources requested for the P2P flow. For example, first AP 115 may receive a SCS request from first STA 125 for a P2P traffic flow between first STA 125 and second STA 130 over a P2P link established between first STA 125 and second STA 130.

In one implementation, the flow identifier may include, but limited to, a TCLAS element for the P2P traffic flow. The TCLAS element may include Internet Protocol (IP) tuple information or a Fully Qualified Domain Name (FQDN) information for the P2P traffic flow for which the QoS resources are being requested. In another implementation, the flow identifier may include device identifiers of peer STAs involved in the P2P traffic flow. The device identifiers may include Media Access Control (MAC) addresses of the peer STAs, that is, a MAC addresses for each of first STA 125 and second STA 130. In yet another implementation, the flow identifier may include a category and type of the P2P traffic flow. The category and type may include, for example, an AR/VR flow, a non-Wireless Fidelity (non-WiFi) P2P flow, etc., The non-WiFi flow may include a Bluetooth P2P traffic flow. In some implementation, the flow identifier may include an application name or an application identifier for an application that may be generating the P2P traffic flow. In some other implementations, the flow identifier may include a Mobile Device Management (MDM) key for one or both of first STA 125 and second STA 130.

In some example SCS requests, first STA 125 may include a plurality of flow identifiers TCLAS elements. For example, if first STA 125 is combining QoS resources request for a plurality of P2P traffic flows in a single SCS request, such SCS request may include a plurality of flow identifiers (for example, TCLAS elements) for the multiple P2P traffic flows. First STA 125 may include a P2P Information Element (IE) in a SCS Descriptor Element of the SCS Request for the P2P traffic flow. The P2P IE may include TCLAS information, MAC addresses and MLD MAC addresses for a MLD STA for identification of P2P peers, and a category/type of the P2P traffic flow. In some examples, first STA 125 may be a group leader for multiple STAs and may send a SCS request on behalf of the group or on behalf of a member of the group.

Once having received the SCS request from first STA 125 for a P2P traffic flow at stage 210, method 200 may proceed to stage 220 where first AP 115 may determine whether to grant the SCS request. Determining whether to grant the SCS request may include determining that a network policy allows the P2P traffic flow based on the flow identifier and determining that first AP 115 can support the QoS resources requested for the P2P traffic flow.

First AP 115 upon receiving the SCS request for the P2P traffic flow, may use the flow identifier (for example, the TCLAS element) to identify the P2P traffic flow for which the SCS request is being made. In addition, first AP 115 may use the TCLAS element to verify a network policy configured for the P2P traffic flows. First AP 115 may have one or more network policies associated with P2P traffic flows stored thereupon. The network policies may be configured for one or more of IP tuple, FQDN flow, MAC addresses, application identifiers, traffic type, device type, etc. or high-level P2P policy. Based on policy verification, first AP 115 may determine whether to authorize or accept the SCS request or reject the request for the P2P traffic flow.

In another implementation, first AP 115 may use fields from the P2P IE (for example, peer MAC addresses, peer MLD MAC addresses, flow category/type, application identifiers, MDM key) by itself or along with the TCLAS information to verify the network policy to determine whether to authorize or accept or reject the SCS request for the P2P traffic flow. For example, first AP 115 may have a network policy that allows accepting a SCS request only for a P2P traffic flow between certain P2P peer MAC addresses and/or for certain category of flows (for example, AR/VR flows with known tethered devices).

First AP 115 may also use one or more of the TCLAS information, P2P IE, and QoS characteristics to authorize the QoS resource request for the P2P traffic flow. For example, first AP 115 may authorize an SCS request if the QoS resource requested is within a predetermined threshold. In one example, first AP 115 may authorize a SCS request when the QoS resource request (for example, a medium time) is below an AP defined threshold value for the P2P traffic flow. Similarly, first AP 115 may authorize a SCS request for an unrecognized TCLAS element between specific P2P peers identified based on MAC addresses, if the QoS resource requested is below a predetermined threshold (that is, a medium time requested is below another AP defined threshold value the P2P traffic flow).

Thus, first AP 115 may authorize the SCS request when both the network policy allows the P2P traffic flow and the QoS resource requested is within a predetermined threshold. If P2P traffic flow is not allowed by the network policy, then first AP 115 may not authorize the SCS request without even when or without determining whether the QoS resource requested is within a predetermined threshold. Similarly, if the QoS resource requested in the SCS request is not within a predetermined threshold, first AP 115 may not authorize the SCS request even when or without determining whether the P2P traffic flow is allowed by the network policy.

First AP 115 may send a SCS response to first STA 125 for the SCS request. The SCS response may notify first STA 125 whether the SCS request for the P2P traffic flow is authorized or not authorized. If the SCS response indicates that the SCS request was not authorized or rejected for the P2P traffic flow, the SCS response may include a reason for denial or rejection. The SCS response may further include a reason code or a status code. In an example, if the SCS request was rejected because the flow identifier (for example, a TCLAS element) associated with the SCS request is not authorized in the network policy, the SCS response for the SCS request may include the following code: SCS_REJECTED_P2P_TCLAS_NOT_AUTHORISED. In above example, the SCS response may include one or more suggested flow identifiers (that is, TCLAS elements) for P2P traffic flows that are allowed as per the network policy.

If first STA 125 included multiple P2P TCLAS elements in the SCS request, first AP 115 may authorize a subset of those P2P TCLAS traffic flows. In this example, first AP 115 may send a SCS response to first STA 125 with a status code indicating a reason for accepting a subset and rejecting the remaining P2P traffic flows and suggested one or more TCLAS elements for P2P traffic flows that are allowed as per the network policy. The status code for the above example may include: SCS_REJECTED_NOT_ALL_P2P_TCLAS_AUTHORISED_SUGGESTED_P2P_TCLAS_INCLUDED. First STA 125 may then send another SCS request with QoS resource request for one or more authorized TCLAS elements.

If the network policy only supports authorizing P2P traffic flows from specific peer STAs and the SCS request for the P2P traffic flow from first STA 125 indicates peer addresses that are not authorized per network policy, then first AP 115 may reject the SCS request. In this example, the SCS response to first STA 125 may include the following status code indicating the reason: SCS_REJECTED_P2P_PEERS_NOT_ALLOWED_PER_POLICY. First AP 115 may, in the SCS response, include a P2P IE indicating peer MAC addresses and/or P2P traffic flow categories/types that are allowed for P2P resource request as per the network policy.

If the network policy only supports authorizing P2P traffic flows from certain applications the SCS request for the P2P traffic flow from first STA 125 indicates application identifiers that are not authorized per network policy, then first AP 115 may reject the SCS request. In this example, the SCS response to first STA 125 may include the following status code indicating the reason: SCS_REJECTED_APPLICATION_NOT_ALLOWED_PER_POLICY. First AP 115 may, in the SCS response, include one or more application identifiers that are allowed for P2P resource request as per the network policy. Once first AP 115 determines whether to grant the SCS request at stage 220, method 200 may then end at stage 230.

Figure 3:
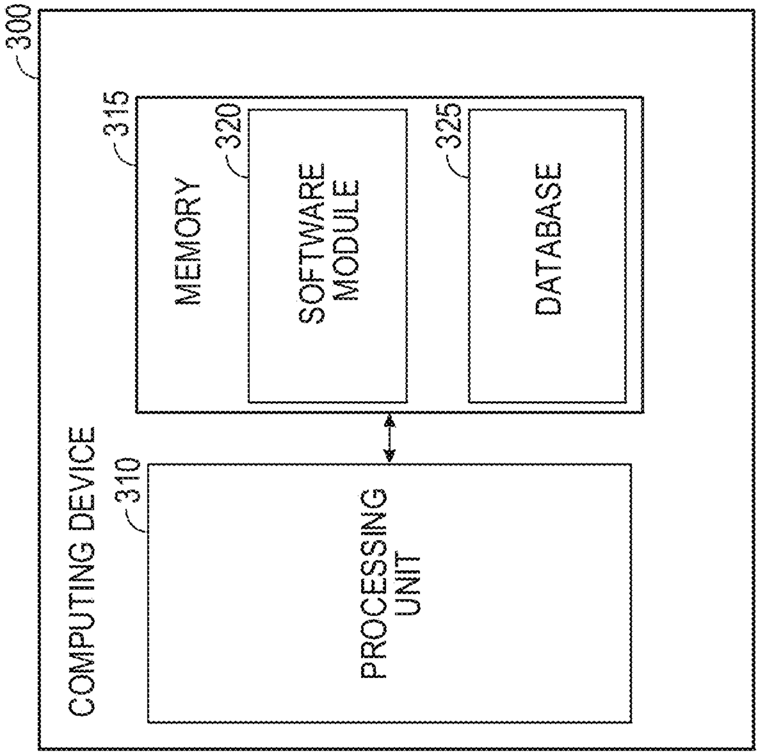
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for authorization for a SCS request for a P2P traffic flow as described above with respect to FIG. 2. Computing device 300, for example, may provide an operating environment for controller 105, first AP 115, second AP 120, first STA 125, second STA 130, or third STA 135. Controller 105, first AP 115, second AP 120, first STA 125, second STA 130, or third STA 135 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

receiving, by an Access Point (AP), a Stream Classification Service (SCS) request from a station for a peer-to-peer traffic flow, the SCS request for the peer-to-peer traffic flow comprising a flow identifier for the peer-to-peer traffic flow and Quality of Service (Qos) resource requested for the peer-to-peer traffic flow, wherein the flow identifier comprises at least peer identifying information for peer stations of the peer-to-peer traffic flow and a category or type of the peer-to-peer traffic flow;

using, by the AP, the peer identifying information and the category or type to verify a network policy configured for peer-to-peer traffic flows; and determining, by the AP, whether to grant the SCS request for the peer-to-peer traffic flow, wherein determining whether to grant the SCS request for the peer-to-peer traffic flow comprises:

determining after verifying the network policy that the verified network policy allows the peer-to-peer traffic flow based on the flow identifier received in the SCS request, and determining that the AP can support the QoS resource requested for the peer-to-peer traffic flow.

2. The method of claim 1, wherein the flow identifier further comprises one or more of: a traffic classifier of the peer-to-peer traffic flow, a device identifier for each peers of the peer-to-peer traffic flow, an application identifier of an application associated with the peer-to-peer traffic flow.

3. The method of claim 1, wherein determining that the network policy allows the peer-to-peer traffic flow based on the flow identifier comprises: determining the network policy associated with the flow identifier, and verifying that the network policy associated with the flow identifier allows the peer-to-peer traffic flow.

4. The method of claim 1, wherein determining that the AP can support the Qos resource requested for the peer-to-peer traffic flow comprises determining that the Qos resource requested for the peer-to-peer traffic flow is below a predetermined threshold.

5. The method of claim 1, wherein determining whether to grant the SCS request comprises: rejecting the SCS request in response to determining that the network policy does not allows the peer-to-peer traffic flow based on the flow identifier; and providing a SCS response to the station, the SCS response comprising a reason code for rejection of the SCS request.

6. The method of claim 1, further comprising: providing a suggested flow identifier that is allowed by the network policy for the peer-to-peer traffic flow.

7. The method of claim 6, further comprising: receiving another SCS request from the station, the another SCS request comprising the suggested flow identifier.

8. The method of claim 1, wherein receiving the SCS request comprises receiving the SCS request comprising a plurality of flow identifiers corresponding to a plurality of peer-to-peer traffic flow, and wherein determining whether to grant the SCS request comprises:

determining to grant a subset of peer-to-peer traffic flows of the plurality of peer-to-peer traffic flows; and determining to reject a remaining peer-to-peer traffic flows of the plurality of peer-to-peer traffic flows.

9. A system comprising:

a memory storage; and a processing unit disposed in a first computing device and coupled to the memory storage, wherein the processing unit is operative to:

receive a Stream Classification Service (SCS) request from a station for a peer-to-peer traffic flow, the SCS request comprising a flow identifier for the peer-to-peer traffic flow and Quality of Service (QoS) resource requested for the peer-to-peer traffic flow wherein the flow identifier comprises at least peer identifying information for peer stations of the peer-to-peer traffic flow and a category or type of the peer-to-peer traffic flow;

use the peer identifying information and the category or type to verify a network policy configured for peer-to-peer traffic flows;

determine whether to grant the SCS request for the peer-to-peer traffic flow, wherein the processing unit being operative to determine whether to grant the SCS request for the peer-to-peer traffic flow comprises the processing unit being operative to:

determine after verifying the network policy that the verified network policy allows the peer-to-peer traffic flow based on the flow identifier received in the SCS request, and determine that an Access Point (AP) can support the QoS resource requested for the peer-to-peer traffic flow.

10. The system of claim 9, wherein the flow identifier further comprises one or more of: a traffic classifier of the peer-to-peer traffic flow, a device identifier for each peers of the peer-to-peer traffic flow, an application identifier of an application associated with the peer-to-peer traffic flow.

11. The system of claim 10, wherein the device identifier comprises a media access control address or a mobile device management key.

12. The system of claim 9, wherein the SCS request comprises a plurality of flow identifiers corresponding to a plurality of peer-to-peer traffic flow, and wherein the processing unit being operative to determine whether to grant the SCS request comprises the processing unit being operative to: determine to grant a subset of peer-to-peer traffic flows of the plurality of peer-to-peer traffic flows; and determine to reject a remaining peer-to-peer traffic flows of the plurality of peer-to-peer traffic flows.

13. The system of claim 12, wherein the processing unit is further operative to:

provide a reason code for rejected peer-to-peer traffic flows of the plurality of peer-to-peer traffic flows.

14. The system of claim 13, wherein the processing unit is further operative to:

provide a suggested flow identifier that is allowed by the network policy for the peer-to-peer traffic flow.

15. The system of claim 14, wherein the processing unit is further operative to:

receive another SCS request from the station, the another SCS request comprising the suggested flow identifier.

16. The system of claim 14, wherein the processing unit being operative to determine that the network policy allows the peer-to-peer traffic flow based on the flow identifier comprises the processing unit being operative to: determine the network policy associated with the flow identifier, and verify that the network policy associated with the flow identifier allows the peer-to-peer traffic flow.

17. A non-transitory computer-readable medium that stores a set of instructions which when executed perform a method executed by the set of instructions comprising:

receiving, by an Access Point (AP), a Stream Classification Service (SCS) request from a station for a peer-to-peer traffic flow, the SCS request for the peer-to-peer traffic flow comprising a flow identifier for the peer-to-peer traffic flow and Quality of Service (Qos) resource requested for the peer-to-peer traffic flow, wherein the flow identifier comprises at least peer identifying information for peer stations of the peer-to-peer traffic flow and a category or type of the peer-to-peer traffic flow;

using, by the AP, the peer identifying information and the category or type to verify a network policy configured for peer-to-peer traffic flows; and determining, by the AP, whether to grant the SCS request for the peer-to-peer traffic flow, wherein determining whether to grant the SCS request for the peer-to-peer traffic flow comprises:

determining after verifying the network policy that the verified network policy allows the peer-to-peer traffic flow based on the flow identifier received in the SCS request, and determining that the AP can support the QoS resource requested for the peer-to-peer traffic flow.

18. The non-transitory computer-readable medium of claim 17, wherein determining that the network policy allows the peer-to-peer traffic flow based on the flow identifier comprises: determining the network policy associated with the flow identifier, and verifying that the network policy associated with the flow identifier allows the peer-to-peer traffic flow.

19. The non-transitory computer-readable medium of claim 17, wherein receiving the SCS request comprises receiving the SCS request comprising a plurality of flow identifiers corresponding to a plurality of peer-to-peer traffic flow, and wherein determining whether to grant the SCS request comprises: determining to grant a subset of peer-to-peer traffic flows of the plurality of peer-to-peer traffic flows; and determining to reject a remaining peer-to-peer traffic flows of the plurality of peer-to-peer traffic flows.

20. The non-transitory computer-readable medium of claim 17, wherein determining whether to grant the SCS request comprises: rejecting the SCS request in response to determining that the network policy does not allows the peer-to-peer traffic flow based on the flow identifier; providing a SCS response to the station, the SCS response comprising a reason code for rejection of the SCS request; and providing a suggested flow identifier that is allowed by the network policy for the peer-to-peer traffic flow.

* * * * *